United States Patent
McFarland

(10) Patent No.: US 11,505,327 B2
(45) Date of Patent: Nov. 22, 2022

(54) GAS DELIVERY AUGMENTER WITH PUMP MECHANISM

(71) Applicant: GOODRICH CORPORATION, Charlotte, NC (US)

(72) Inventor: Eric McFarland, Laveen, AZ (US)

(73) Assignee: Goodrich Corporation, Charlotte, NC (US)

( * ) Notice: Subject to any disclaimer, the term of this patent is extended or adjusted under 35 U.S.C. 154(b) by 339 days.

(21) Appl. No.: 16/820,059

(22) Filed: Mar. 16, 2020

(65) Prior Publication Data

US 2021/0284347 A1 Sep. 16, 2021

(51) Int. Cl.
*B64D 25/14* (2006.01)
*F01C 1/344* (2006.01)
*F01C 21/18* (2006.01)
*F01C 13/04* (2006.01)

(52) U.S. Cl.
CPC .............. *B64D 25/14* (2013.01); *F01C 1/344* (2013.01); *F01C 13/04* (2013.01); *F01C 21/18* (2013.01)

(58) Field of Classification Search
CPC .......... B64D 25/14; F01C 1/344; F01C 13/04; F01C 21/18
See application file for complete search history.

(56) References Cited

U.S. PATENT DOCUMENTS

| | | | |
|---|---|---|---|
| 5,738,305 A * | 4/1998 | Pruitt | A62B 1/20 193/25 B |
| 8,156,919 B2 | 4/2012 | Darrow | |
| 2016/0003045 A1* | 1/2016 | Fortini | F01C 13/04 418/197 |
| 2020/0361615 A1* | 11/2020 | Mueller | B64D 25/14 |

FOREIGN PATENT DOCUMENTS

| CZ | 305114 | 5/2015 |
|---|---|---|
| WO | 2015154645 | 10/2015 |
| WO | WO-2016205188 A1 * | 12/2016 |

* cited by examiner

*Primary Examiner* — Mary Davis
(74) *Attorney, Agent, or Firm* — Snell & Wilmer L.L.P.

(57) ABSTRACT

A gas delivery augmenter may include a pump mechanism for facilitating inflation of an inflatable. The pump mechanism is generally configured to be driven/powered by pressure-volume energy from a primary gas received by the gas delivery augmenter, and the pump mechanism of the gas delivery augmenter is configured to entrain a secondary gas deliver the entrained secondary gas (and any remaining primary gas) to the inflatable. The pump mechanism, as described in greater detail below, enables secondary gas to be pumped/delivered to the inflatable even as the inflatable backpressure increases, thus providing improved inflation over conventional aspirators.

15 Claims, 3 Drawing Sheets

GAS DELIVERY AUGMENTER WITH PUMP MECHANISM

FIELD

The present disclosure relates to aspirators for inflatable assemblies, and in particular to gas delivery augmenters having pump mechanisms for inflatable assemblies.

BACKGROUND

Emergency evacuation assemblies generally include an inflatable structure, such an evacuation slide or a life raft, which may be used to exit an aircraft absent a jet way and/or in the event of a water landing. The gas used to inflate the inflatable structure is typically supplied by a cylinder containing compressed gas (such as nitrogen). The volume of the gas supplied to the inflatable may be multiplied by injecting the supplied gas into an aspirator, which draws in ambient air that is combined with the supplied gas to inflate the inflatable structure. Conventional aspirators often employ the venturi and/or Coanda effect to use the flow of supplied gas to create a low pressure region in the flow stream, which draws in ambient air.

SUMMARY

In various embodiments, the present disclosure provides a gas delivery augmenter comprising a pump mechanism. The gas delivery augmenter may be configured to receive a primary gas from a gas supply, wherein reception of the primary gas is configured to drive the pump mechanism using pressure-volume energy from the primary gas to entrain a secondary gas and pump at least a portion of the primary gas and the secondary gas to an inflatable.

The pump mechanism may be a positive displacement pump, such as a rotary vane pump. The gas delivery augmenter may include a housing within which the rotary vane pump is disposed. The gas delivery augmenter may further include a first inlet, an initial gas outlet, a second inlet, and a final outlet defined in the housing. The first inlet may be configured to receive the primary gas from the gas supply, with at least an initial portion of the primary gas is configured to exit the gas delivery augmenter into the inflatable via the initial gas outlet. The rotary vane pump may be configured to entrain secondary gas into the housing via the second inlet and the combination of the secondary gas and a remaining portion of the primary gas may be delivered to the inflatable via the final outlet.

In various embodiments, the rotary vane pump comprises a vane rotor assembly configured to rotate within the housing. The vane rotor assembly may include a rotor and a plurality of vanes configured to rotate around a rotation axis that is offset from a centerline axis of the housing. The plurality of vanes may be circumferentially distributed around the rotor and slidably retained within respective radial slots defined in the rotor. Radially outward tips of the plurality of vanes are configured to remain in contact with a radially inward surface of the housing as the plurality of vanes rotate around the rotation axis, according to various embodiments.

In various embodiments, the housing of the gas delivery augmenter is cylindrical, and the first inlet, the initial gas outlet, the second inlet, and the final outlet are circumferentially spaced apart around the housing. In various embodiments, a first radial distance between the first inlet and the rotation axis is less than a second radial distance between the initial gas outlet and the rotation axis. In various embodiments, the second radial distance is less than a third radial distance between the second inlet and the rotation axis.

In various embodiments, the plurality of vanes are evenly distributed around the rotor such that a constant angle is defined between adjacent vanes of the plurality of vanes. The plurality of vanes divide an internal volume defined between the housing and the rotor into rotatable vane compartments that have varying volumes that correspond to their instantaneous rotational position about the rotation axis, according to various embodiments. In various embodiments, the first inlet, the initial gas outlet, the second inlet, and the final outlet are circumferentially spaced apart from each other by at least the constant angle (e.g., the inlets/outlets may be displaced farther apart from each other, but the minimum angular distance between respective circumferentially adjacent edges of adjacent inlets/outlets is the constant angle). The first inlet, the initial gas outlet, and the second inlet are defined and disposed on an expansion half of the housing and the final outlet is defined and disposed on a compression half of the housing.

Also disclosed herein, according to various embodiments, is an inflation system that includes the gas delivery augmenter having any of the features mentioned above and a gas supply configured to provide the primary gas. Still further, disclosed herein, according to various embodiments, is an evacuation assembly of an aircraft. The evacuation assembly may include the gas delivery augmenter having any of the features mentioned above, the gas supply, and an inflatable slide. In various embodiments, the gas delivery augmenter is disposed within the inflatable volume of the evacuation slide, and thus the assembly includes a primary gas manifold for delivery primary gas to the gas delivery augmenter and an ambient air manifold for delivering the secondary gas to the gas delivery augmenter.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
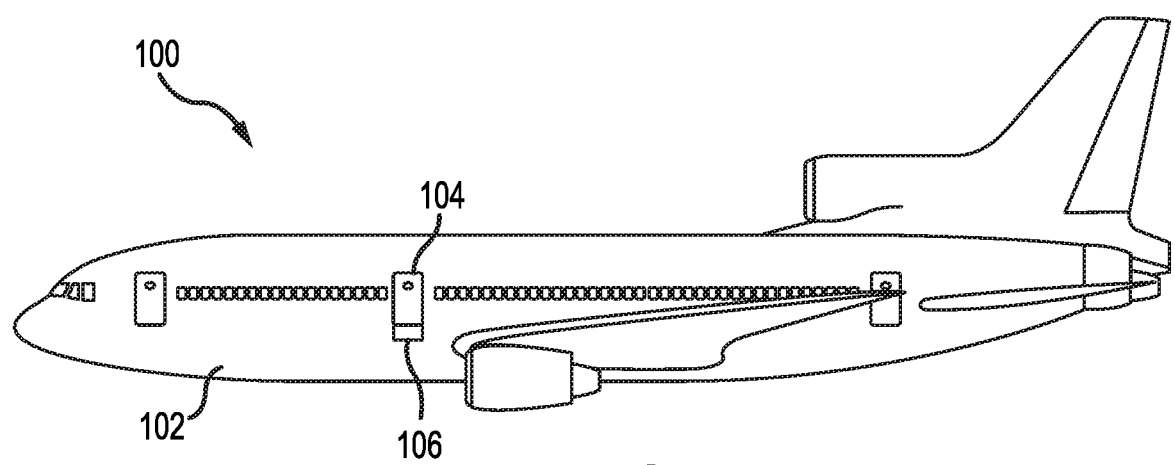
FIG. 1 illustrates an aircraft including an evacuation assembly, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, is a gas delivery augmenter comprising a pump mechanism for facilitating inflation of an inflatable. The pump mechanism is generally configured to be driven/powered by pressure-volume energy from a primary gas received by the gas delivery augmenter, and the pump mechanism of the gas delivery augmenter is configured to entrain a secondary gas and deliver the entrained secondary gas (and any remaining primary gas) to the inflatable. The pump mechanism, as described in greater detail below, enables secondary gas to be pumped/delivered to the inflatable even as the inflatable backpressure increases, thus providing improved inflation over conventional aspirators. Though numerous details and examples are included herein pertaining to methods, systems, and articles particular to evacuation slides and/or life raft assemblies, the present disclosure is not necessarily so limited, and thus aspects of the disclosed embodiments may be adapted for performance in a variety of other uses. As such, numerous applications of the present disclosure may be realized.

In accordance with various embodiments, and with reference to FIG. 1, an aircraft 100 is shown. Aircraft 100 may include a fuselage 102 having plurality of exit doors, including an exit door 104. Aircraft 100 may include one or more evacuation systems positioned near a corresponding exit door. For example, aircraft 100 includes an evacuation assembly 106 positioned near exit door 104. In the event of an emergency, exit door 104 may be opened by a passenger or crew member of aircraft 100. Evacuation assembly 106 may deploy in response to exit door 104 being opened and/or in response to an action taken by a passenger or crew member such as depression of a button or actuation of a lever. While evacuation assembly 106 is disclosed as deploying from exit door 104, it is further contemplated and understood that evacuation assembly 106 may deploy from other locations. For example, evacuation assembly 106 may deploy from a wing of aircraft 100.

Figure 2:
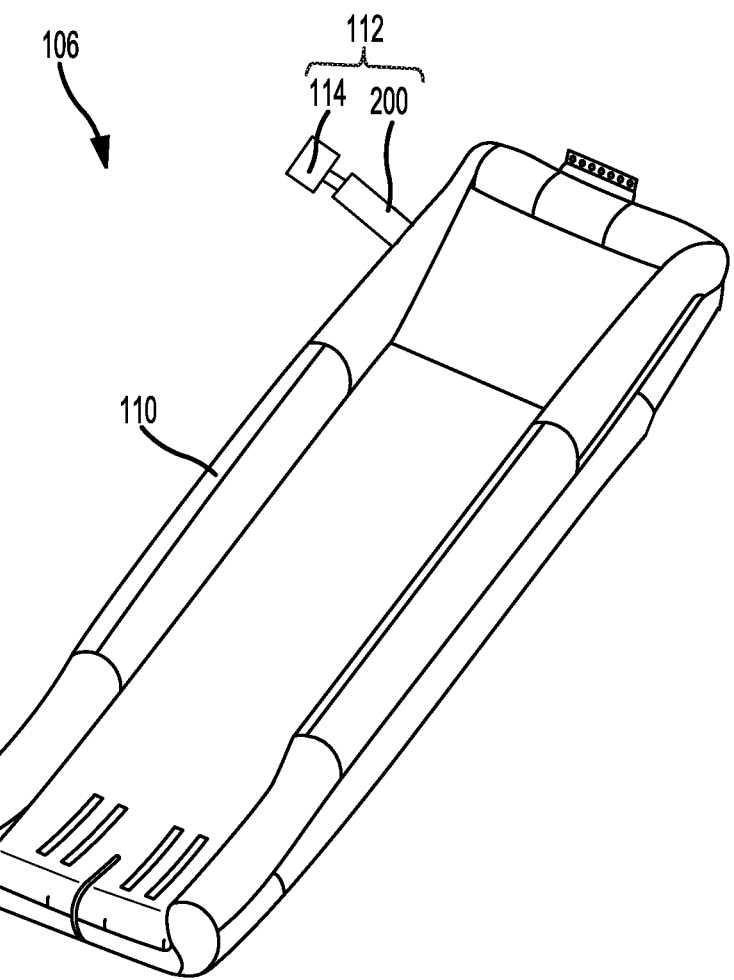
FIG. 2 illustrates an evacuation assembly including an inflatable structure in a deployed position, in accordance with various embodiments.

With reference to FIG. 2, evacuation assembly 106 is illustrated in a deployed position. In accordance with various embodiments, evacuation assembly 106 includes an inflatable 110. In various embodiments, inflatable 110 may be an evacuation slide. In various embodiments, inflatable 110 may be a life raft, a life vest, or any other inflatable structure. Inflatable 110 (referred to herein as evacuation slide 110) may be deployed from aircraft 100 in FIG. 1.

Evacuation assembly 106 may further include an inflation system 112. Inflation system 112 may include one or more gas supplies 114 configured to inflate evacuation slide 110. Gas supply 114 is fluidly coupled to evacuation slide 110. In various embodiments, gas supply 114 may comprise a solid gas generating material. The solid gas generating material may be configured to provide a gas to evacuation slide 110 in response to a combustion and/or exothermic reaction of the solid gas generating material. In various embodiments, gas supply 114 may comprise a charge tank including a compressed gas. In various embodiments, gas supply 114 may comprise a combination of compressed gas, cryogenic fluid, and solid gas generating material.

In accordance with various embodiments, inflation system 112 of evacuation assembly 106 further includes a gas delivery augmenter 200 fluidly coupled to gas supply 114. In accordance with various embodiments, gas delivery augmenter 200 is fluidly coupled between gas supply 114 and evacuation slide 110. As discussed in further detail below, the gas delivery augmenter 200 may be configured to entrain ambient air with gas output from gas supply 114 (referred to herein as primary gas). For example, in response to deployment of evacuation slide 110, primary gas from gas supply 114 may flow into the gas delivery augmenter 200 and cause the gas delivery augmenter 200 to draw in a secondary gas (i.e., ambient air) from the environment, as described in greater detail below. The primary gas flow and the environmental gas may be directed into evacuation slide 110. In response to receiving the primary gas and the environmental gas, evacuation slide 110 begins to inflate. While inflation system 112 is described as inflating evacuation slide 110, it is further contemplated and understood that inflation system 112 may be employed to inflate other inflatable structures such as life rafts, life vests, or any other desired inflatable, or in other applications where fluid delivery is warranted.

In various embodiments, the gas delivery augmenter 200 comprises a pump mechanism that is configured to be driven in response to the pressure-volume energy from flow of the primary gas from the gas supply 114. Said differently, the gas delivery augmenter is configured to receive a primary gas from a gas supply, and the pressure-volume energy from this flow of the primary gas is used to drive the pump mechanism to 1) entrain a secondary gas and 2) pump at least a portion of the primary gas and the secondary gas to an inflatable. In various embodiments, the pump mechanism of the gas delivery augmenter 200 is a positive displacement pump. For example, the pump mechanism may be a rotary vane pump, as described in greater detail below.

Figure 3:
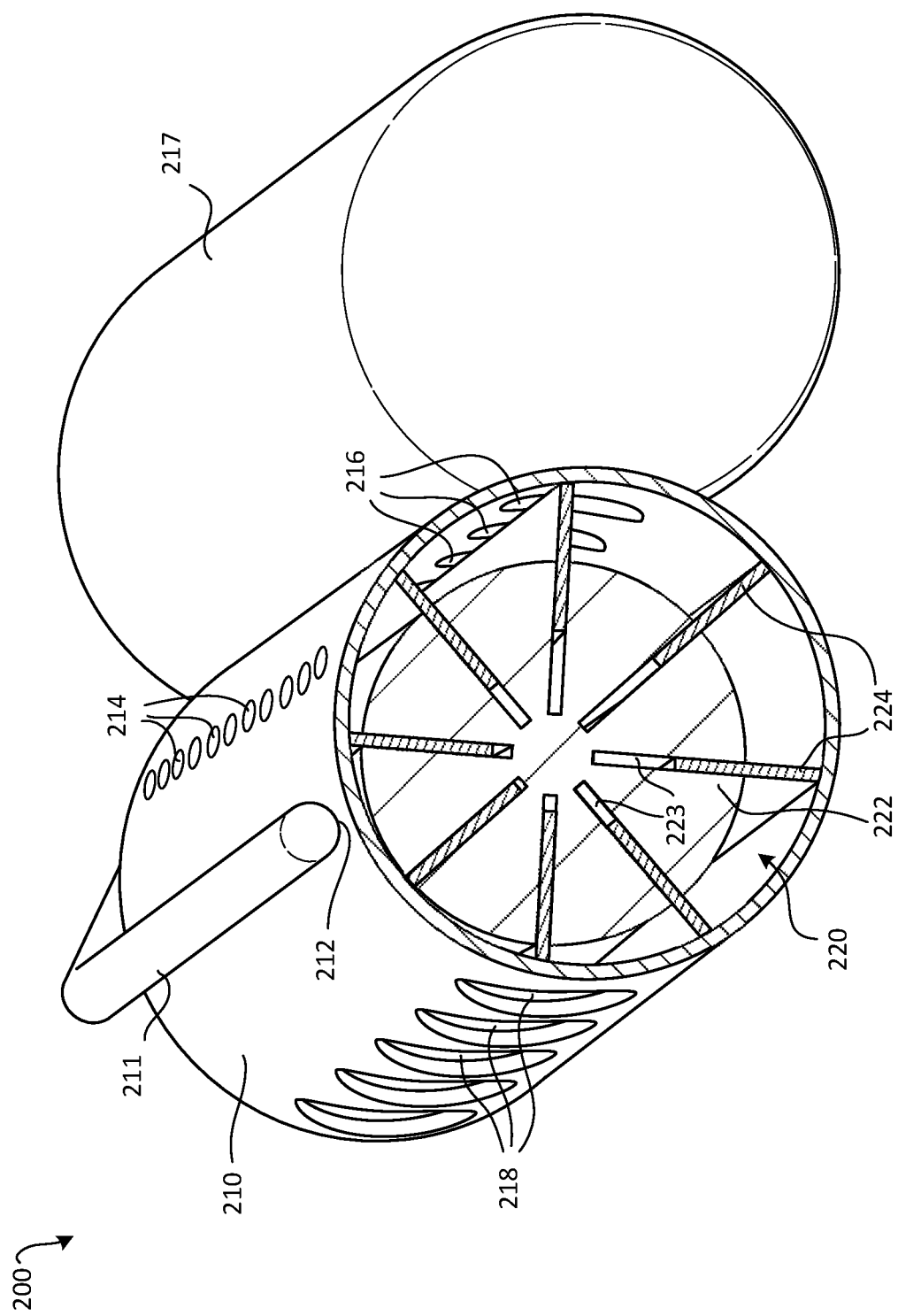
FIG. 3 illustrates a perspective cross-sectional view of a gas delivery augmenter, in accordance with various embodiments.
Figure 4:
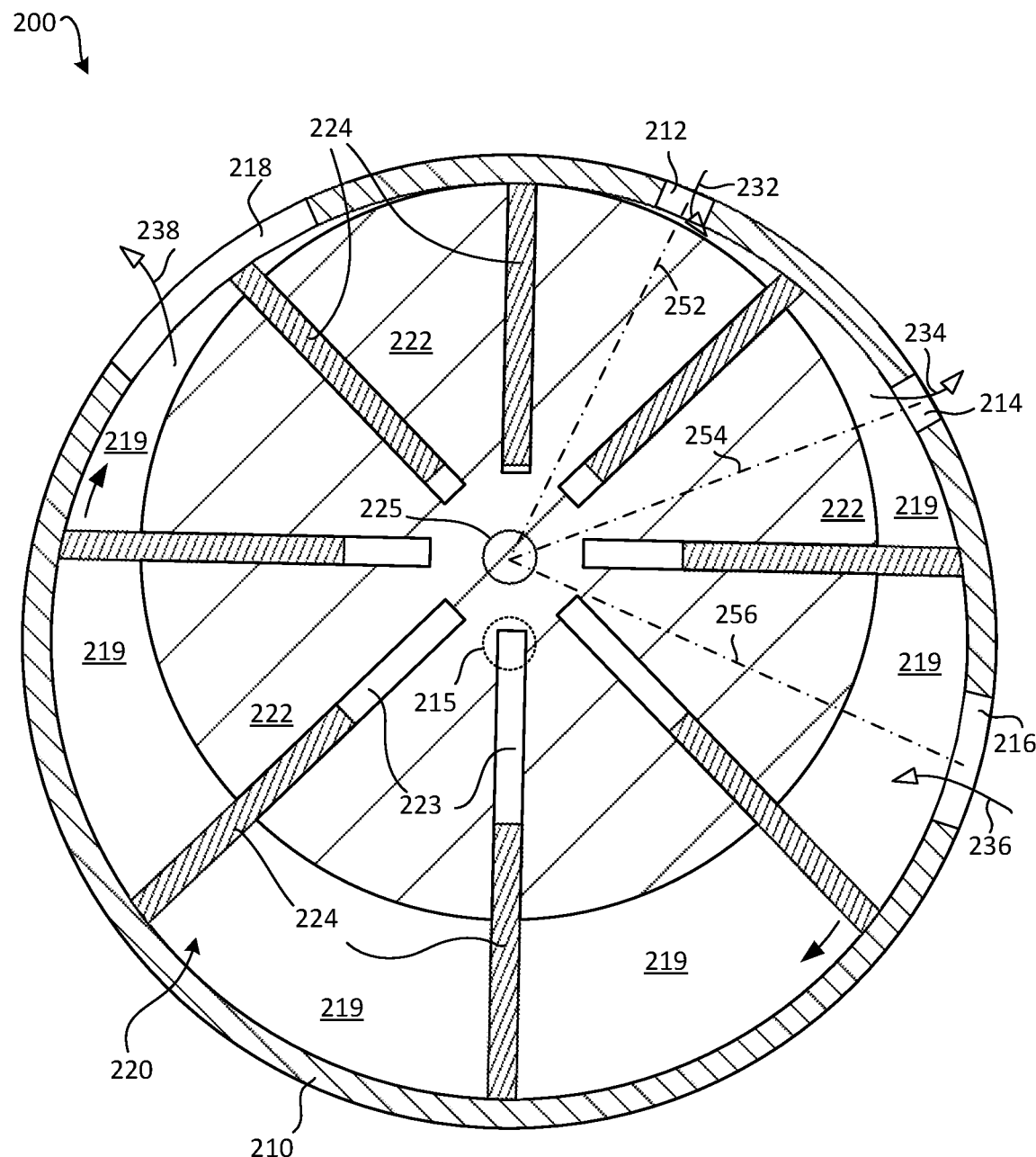
FIG. 4 illustrates a cross-sectional view of a gas delivery augmenter, in accordance with various embodiments.

In various embodiments, and with reference to FIGS. 3 and 4, the pump mechanism of the gas delivery augmenter 200 is a rotary vane pump. The gas delivery augmenter may include a housing 210 defining an internal volume within which the rotary vane pump is housed. In various embodiments, the housing 210 defines a first inlet 212 (FIG. 4 more clearly shows the inlet) that is configured to receive primary gas 232 from a gas supply (e.g., gas supply 114). Accordingly, a gas delivery manifold 211 may be coupled to the first inlet 212 to deliver the primary gas from the gas supply 114 to the gas delivery augmenter 200. In various embodiments, the housing 210 further defines an initial gas outlet 214, a second inlet 216, and a final outlet 218. The first inlet 212, the initial gas outlet 214, the second inlet 216, and the final outlet are circumferentially spaced apart from each other, as described in greater detail below. Generally, the gas delivery augmenter 200 is configured such that the primary gas exits the housing through the initial gas outlet 214 after pressure-volume energy from the primary gas has been utilized to drive the pump mechanism (as described in greater detail below). The driven pump mechanism draws/entrains a secondary gas 236 via the second inlet 216, and the combination 238 of any remaining primary gas and the entrained secondary gas are delivered to the inflatable via the final outlet.

In various embodiments, the gas delivery augmenter 200 is disposed within an inflatable volume of an inflatable device (e.g., the evacuation slide 110), and thus the primary gas and ambient/environmental air may be routed to the gas delivery augmenter via gas delivery manifolds 211, 217, respectively. That is, the primary gas may be routed to the gas delivery augmenter via gas delivery manifold 211 and ambient air to be entrained may be supplied via manifold 217. However, in various embodiments, the gas delivery augmenter may be disposed outside the evacuation slide, and thus manifolds may be utilized to route the gas exiting the gas delivery augmenter to the inflatable volume.

In various embodiments, and with reference to FIGS. 3 and 4, the rotary vane pump includes a vane rotor assembly 220 disposed within the housing 210, with the vane rotor assembly being configured to rotate within the housing 210. The vane rotor assembly 220 comprises a rotation axis 225 (FIG. 4) that is offset from a centerline axis 215 (FIG. 4) of the housing 210. That is, the housing may be cylindrical, and the centerline axis 215 of the housing may be parallel to, but offset from, the rotation axis 225 of the vane rotor assembly 220. The vane rotor assembly 220 may include a rotor 222 configured to rotate around the rotation axis 225 and a plurality of vanes 224 circumferentially distributed around the rotor 222 and slidably retained within respective radial slots 223 defined in the rotor 222. The radially outward tips of the plurality of vanes may be configured to remain in contact with a radially inward surface of the housing as the plurality of vanes rotate around the rotation axis.

As shown in FIG. 4, rotation of the rotor 222 and the radially sliding vanes 224 divides the internal volume of the housing 210 defined between the rotor 222 and the internal surface of the housing 210 into rotatable vane compartments 219 that have varying volumes that correspond to their instantaneous rotational position about the rotation axis 225. Said differently, one half/side of the gas delivery augmenter 200 (e.g., the right side shown FIG. 4) is an expansion half of the gas delivery augmenter and the other half/side of the gas delivery augmenter 200 (e.g., the left side shown in FIG. 4) is a compression half. That is, the rotatable vane compartments 219 may increase in volume on the expansion half of the gas delivery augmenter, with the expansion of the primary gas causing work to be done on the vane rotor assembly to drive rotation thereof and subsequent volume increases to cause the secondary gas to be entrained via the second inlet 216. The rotatable vane compartments 219 moving through the compression half of the gas delivery augmenter decrease in volume, thereby compressing the gas contained therein such that the combined gas if delivered via the final outlet 218 to the inflatable. Accordingly, the first inlet 212, the initial gas outlet 214, and the second inlet 216 may be disposed on a first half (e.g., semi-cylinder) of the gas delivery augmenter 200 and the final outlet 218 may be disposed on the opposite half of the gas delivery augmenter 200.

In various embodiments, and with reference to FIG. 4, a first radial 252 distance between the first inlet 212 and the rotation axis 225 is less than a second radial distance 254 between the initial gas outlet 214 and the rotation axis 225. In various embodiments, the second radial distance 254 is less than a third radial distance 256 between the second inlet 216 and the rotation axis 225. Said differently, the distance from the rotation axis 225 increases from the first inlet to the initial gas outlet to the second inlet, pertaining to the increase in volume for the rotatable vane compartments 219 on the expansion half of the gas delivery augmenter 200.

In various embodiments, the plurality of vanes 224 are evenly distributed around the rotor 222 such that a constant angle (e.g., a uniform angle) is defined between adjacent vanes of the plurality of vanes 224. The first inlet, the initial gas outlet, the second inlet, and the final outlet may be circumferentially spaced apart from each other by at least the constant angle (e.g., the inlets/outlets may be displaced farther apart from each other, but the minimum angular distance between respective circumferentially adjacent edges of adjacent inlets/outlets is the constant angle). That is, adjacent inlets/outlets are never in direct fluid communication with each other via a single vane compartment 219, according to various embodiments. In various embodiments, and with reference to FIG. 4, the final outlet 218 and the first inlet 212 may be angularly spaced apart from each other by the constant angle. Said differently, respective circumferentially adjacent edges of the final outlet 218 and the inlet 212 may be angularly spaced apart by the constant angle, such that as soon as a vane compartment 219 is no longer in fluid communication with the final outlet 218 it comes into fluid communication with the first inlet 212. This may enhance the operational efficiency of the vane rotor assembly 220. In various embodiments, the first inlet, the initial gas outlet, the second inlet, and the final outlet are not evenly distributed around the housing.

In various embodiments, the number, size, shape, and configuration, of the plurality of vanes 224 may be different than what is shown in the figures. For example, the vane rotor assembly 220 may include fewer than the 8 vanes depicted (e.g., 4-7 vanes defining a corresponding number of vane compartments) or more than 8 vanes. In various embodiments, the size, shape, configuration, and exact angular position/distribution of the inlets 212, 216, and the outlets 214, 218 may be different than what is shown in the figures. For example, the inlets 212, 216 and outlets 218, 218 may include a series of individual holes/apertures (as shown in FIG. 3), or the inlets 212, 216 and outlets 218, 218 may include a single window (e.g., an elongated channel) through which the gas is configured to pass. The dimensions, shapes, and placement of the inlets 212, 216 and outlets 218, 218 may be selected based on end-use application.

In various embodiments, the gas delivery augmenter may be utilized as a final-stage gas delivery augmenter to complete inflation of an inflatable that has already some inflation from one or more conventional inflation systems. That is, ability of the disclosed gas delivery augmenter to deliver gas to the inflatable despite the increasing backpressure from the nearly inflated inflatable may enable this gas delivery augmenter to be especially helpful for final filling of the inflatable (e.g., "topping off" the inflatable, where back pressure would be at or near a relative high value).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas delivery augmenter comprising:
    a pump mechanism comprising a rotary vane pump;
    a housing within which the rotary vane pump is disposed;
    a first inlet defined in the housing, the first inlet configured to receive a primary gas from a gas supply;
    an initial gas outlet defined in the housing through which at least an initial portion of the primary gas is configured to exit the gas delivery augmenter into an inflatable;
    a second inlet defined in the housing, wherein the rotary vane pump is configured to entrain a secondary gas into the housing via the second inlet; and
    a final outlet defined in the housing, wherein the rotary vane pump is configured to pump a remaining portion of the primary gas and the secondary gas into the inflatable via the final outlet, wherein reception of the primary gas is configured to drive the pump mechanism using pressure-volume energy from the primary gas to entrain the secondary gas.

2. The gas delivery augmenter of claim 1, wherein the rotary vane pump comprises a vane rotor assembly configured to rotate within the housing.

3. The gas delivery augmenter of claim 2, wherein the vane rotor assembly comprises:
    a rotor configured to rotate around a rotation axis that is offset from a centerline axis of the housing;
    a plurality of vanes circumferentially distributed around the rotor and slidably retained within respective radial slots defined in the rotor, wherein radially outward tips of the plurality of vanes are configured to remain in contact with a radially inward surface of the housing as the plurality of vanes rotate around the rotation axis.

4. The gas delivery augmenter of claim 3, wherein:
    the housing is cylindrical; and
    the first inlet, the initial gas outlet, the second inlet, and the final outlet are circumferentially spaced apart around the housing.

5. The gas delivery augmenter of claim 4, wherein a first radial distance between the first inlet and the rotation axis is less than a second radial distance between the initial gas outlet and the rotation axis.

6. The gas delivery augmenter of claim 5, wherein the second radial distance is less than a third radial distance between the second inlet and the rotation axis.

7. The gas delivery augmenter of claim 4, wherein:
    the plurality of vanes are evenly distributed around the rotor such that a constant angle is defined between adjacent vanes of the plurality of vanes; and
    the plurality of vanes divide an internal volume defined between the housing and the rotor into rotatable vane compartments that have varying volumes that correspond to their instantaneous rotational position about the rotation axis.

8. The gas delivery augmenter of claim 7, wherein the first inlet, the initial gas outlet, the second inlet, and the final outlet are circumferentially spaced apart from each other by at least the constant angle.

9. The gas delivery augmenter of claim 8, wherein the first inlet, the initial gas outlet, and the second inlet are defined and disposed on an expansion half of the housing and the final outlet is defined and disposed on a compression half of the housing.

10. An inflation system comprising:
    a gas supply configured to provide a primary gas; and
    a gas delivery augmenter coupled to the gas supply and comprising:
        a pump mechanism, the pump mechanism including a rotary vane pump;
        a housing within which the rotary vane pump is disposed;
        a first inlet defined in the housing, wherein the first inlet is configured to receive the primary gas from the gas supply;

an initial gas outlet defined in the housing through which at least an initial portion of the primary gas is configured to exit the gas delivery augmenter into an inflatable;

a second inlet defined in the housing, wherein the rotary vane pump is configured to entrain a secondary gas into the housing via the second inlet; and a final outlet defined in the housing, wherein the rotary vane pump is configured to pump a remaining portion of the primary gas and the secondary gas into the inflatable via the final outlet, wherein in response to reception of the primary gas, the gas delivery augmenter is configured to drive the pump mechanism using pressure-volume energy from the primary gas to entrain the secondary gas.

11. The inflation system of claim 10, wherein the rotary vane pump comprises a vane rotor assembly configured to rotate within the housing of the gas delivery augmenter, wherein the vane rotor assembly comprises:

a rotor configured to rotate around a rotation axis that is offset from a centerline axis of the housing;

a plurality of vanes circumferentially distributed around the rotor and slidably retained within respective radial slots defined in the rotor, wherein radially outward tips of the plurality of vanes are configured to remain in contact with a radially inward surface of the housing as the plurality of vanes rotate around the rotation axis.

12. The inflation system of claim 11, wherein:

the housing is cylindrical;

the first inlet, the initial gas outlet, the second inlet, and the final outlet are circumferentially spaced apart around the housing; and a first radial distance between the first inlet and the rotation axis is less than a second radial distance between the initial gas outlet and the rotation axis; and the second radial distance is less than a third radial distance between the second inlet and the rotation axis.

13. The inflation system of claim 11, wherein:

the plurality of vanes are evenly distributed around the rotor such that a constant angle is defined between adjacent vanes of the plurality of vanes;

the plurality of vanes divide an internal volume defined between the housing and the rotor into rotatable vane compartments that have varying volumes that correspond to their instantaneous rotational position about the rotation axis; and the first inlet, the initial gas outlet, the second inlet, and the final outlet are circumferentially spaced apart from each other by at least the constant angle.

14. The inflation system of claim 13, wherein the first inlet, the initial gas outlet, and the second inlet are defined and disposed on an expansion half of the housing and the final outlet is defined and disposed on a compression half of the housing.

15. An evacuation assembly of an aircraft, the evacuation assembly comprising:

an inflatable slide;

a gas supply configured to provide a primary gas; and a gas delivery augmenter coupled to the gas supply and comprising:

a pump mechanism including a rotary vane pump;

a housing within which the rotary vane pump is disposed, wherein the housing is disposed within an inflatable volume of the inflatable slide;

a first inlet defined in the housing, wherein the first inlet is configured to receive the primary gas from the gas supply;

an initial gas outlet defined in the housing through which at least an initial portion of the primary gas is configured to exit the gas delivery augmenter into the inflatable slide;

a second inlet defined in the housing, wherein the rotary vane pump is configured to entrain a secondary gas into the housing via the second inlet; and a final outlet defined in the housing, wherein the rotary vane pump is configured to pump a remaining portion of the primary gas and the secondary gas into the inflatable slide via the final outlet, wherein in response to reception of the primary gas the gas delivery augmenter is configured to drive the pump mechanism using pressure-volume energy from the primary gas to entrain the secondary gas.

* * * * *